(12) United States Patent  
Tessaro et al.

(10) Patent No.: US 12,115,882 B2  
(45) Date of Patent: Oct. 15, 2024

(54) METHOD AND SYSTEM FOR VEHICLE BRAKING

(71) Applicant: DANA ITALIA S.R.L., Arco (IT)

(72) Inventors: Nicola Tessaro, Arco (IT); Lorenzo Serrao, Rovereto (IT)

(73) Assignee: DANA ITALIA S.R.L., Arco (IT)

( * ) Notice: Subject to any disclaimer, the term of this patent is extended or adjusted under 35 U.S.C. 154(b) by 496 days.

(21) Appl. No.: 17/362,682

(22) Filed: Jun. 29, 2021

(65) Prior Publication Data

US 2022/0410720 A1    Dec. 29, 2022

(51) Int. Cl.
| | |
|---|---|
| B60L 7/26 | (2006.01) |
| B60L 7/18 | (2006.01) |
| B60L 15/20 | (2006.01) |

(52) U.S. Cl.
CPC ................... B60L 7/26 (2013.01); B60L 7/18 (2013.01); B60L 15/2009 (2013.01); *B60L 2200/42* (2013.01); *B60L 2240/421* (2013.01); *B60L 2240/423* (2013.01); *B60L 2250/28* (2013.01); *B60L 2260/22* (2013.01)

(58) Field of Classification Search
None
See application file for complete search history.

(56) References Cited

U.S. PATENT DOCUMENTS

| | | | |
|---|---|---|---|
| 7,502,679 B2 | 3/2009 | Tabata et al. | |
| 8,060,287 B2 | 11/2011 | Headlee et al. | |
| 10,710,463 B2 | 7/2020 | Sawada et al. | |
| 2005/0194837 A1* | 9/2005 | Loring | B60L 7/26 303/155 |
| 2006/0047400 A1* | 3/2006 | Prakash | B60L 7/14 701/70 |
| 2007/0084450 A1 | 4/2007 | Oka et al. | |
| 2009/0272608 A1* | 11/2009 | Bourqui | B60L 15/2009 188/160 |
| 2019/0135249 A1* | 5/2019 | Fridman | F16D 55/226 |
| 2021/0237583 A1* | 8/2021 | Huang | F16D 61/00 |

FOREIGN PATENT DOCUMENTS

EP          2226226 A2 *  9/2010 ............... B60T 1/10

* cited by examiner

*Primary Examiner* — Todd Melton  
*Assistant Examiner* — Jason R Roberson  
(74) *Attorney, Agent, or Firm* — McCoy Russell LLP

(57) ABSTRACT

Methods and systems are provided for utilizing a parking brake in conjunction with negative torque from an electric motor during vehicle braking. In one example, a method may include applying the parking brake in conjunction with negative torque from the electric motor, until the vehicle speed reduces to a speed threshold, and then releasing the parking brake.

7 Claims, 10 Drawing Sheets

METHOD AND SYSTEM FOR VEHICLE BRAKING

TECHNICAL FIELD

The present description relates generally to methods and systems for providing a braking force in a vehicle via combined actuation of an electric motor and a parking brake.

BACKGROUND AND SUMMARY

A service vehicle such as a fork lift truck may be operated via an electric motor which may be used to drive the vehicle and provide power to operate machinery. The electric motor may be powered by a battery and the motor may be operated either to provide torque while the vehicle is operating or to absorb energy from vehicle motion while the vehicle is decelerating to enable braking. The electric motor may therefore be used to provide negative torque to decelerate the vehicle without use of a service brake. Such vehicles may also include a parking brake which may be engaged when the vehicle is stopped and the machinery is not operating.

In one example approach shown by Sawada et al. in U.S. Pat. No. 10,710,463, an electric machine may be used in combination with a parking brake to provide a desired braking force to a vehicle. Therein, the braking force generated by regeneration of the electric machine may be used for decelerating or stopping the vehicle, and upon stopping, a mechanical braking force such as via a parking brake may be used for maintaining the vehicle stop without the braking force by the electric machine.

However, the inventors herein have recognized potential issues with such systems. In the method described by Sawada et al., although both the electric machine and the parking brake are used to attain a desired level of braking, the parking brake may be applied after the vehicle has stopped. For service vehicles which include heavy machinery, deceleration may be desired during vehicle operation and, in order to provide the negative torque needed to attain the deceleration within a desired time, a larger electric machine may be needed. Use of a larger electric machine may add to the cost and complexity of the vehicle system. Instead of using the electric machine, a parking brake may be used to decelerate and stop the vehicle upon demand. However, repeated use of the parking brake to provide the entire braking force for vehicle deceleration may cause mechanical wear in the parking brake. As an example, a service brake may be included in the vehicle system to be used for decelerating the vehicle. However, addition of another component may add to cost and packaging concerns.

In one example, the issues described above may be addressed by a method for a vehicle, comprising: concurrently applying a first negative torque from a parking brake and a second negative torque from an electric motor until a speed of the vehicle reduces to a threshold speed, and then deactivating the parking brake. In this way, by coordinating operation of the electric motor and the parking brake, a desired level of braking may be attained.

As one example, during vehicle operation above a threshold speed, if an operator indicates an intention to decelerate, a first negative torque may be applied by the parking brake while a second negative torque may be applied by the electric motor to attain a desired level of deceleration. The threshold speed may be calibrated based on the motor torque generated upon the indication of deceleration, a motor RPM, a characteristic of the parking brake, a frequency of brake application, and a level of brake energy dissipation during the drive cycle. In a first example, a constant level of brake torque may be applied by the parking brake and a constant level of negative torque may be applied by the electric motor until the desired deceleration is attained. The constant level of brake torque may be lower than the maximum possible brake torque that may be applied by the parking brake. In a second example, a constant level of brake torque may be applied by the parking brake and a constant level of negative torque may be applied by the electric motor until the vehicle speed is reduced to a first lower speed, and then the parking brake may be disabled and the entire negative torque applied to decelerate the vehicle may be provided by the electric motor. In a third example, a first constant level of brake torque may be applied by the parking brake and a first constant level of negative torque may be applied by the electric motor until the vehicle speed reduced to a first lower speed, and then a second constant level of brake torque may be applied by the parking brake and a second constant level of negative torque may be applied by the electric motor until the vehicle speed reduced to a second lower speed. Upon reaching the second lower speed, the parking brake may be disabled and the entire negative torque may be provided by the electric motor.

In this way, by supplementing operation of the electric motor with the parking brake to provide a desired level of deceleration with a desired time, a smaller sized electric motor may be used for providing a brake force to a vehicle. By using the parking brake as a supplement to the negative torque of the electric motor, the level of brake torque applied by the parking brake is reduced, thereby reducing the wear of the parking brake. The technical effect of using a combination of electric motor negative torque and parking torque for braking is that a service brake may be eliminated from the vehicle system. By reducing the size of the electric motor and eliminating a service brake, manufacturing cost of the vehicle may be reduced and packaging may be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIG. 2 is shown approximately to scale, although other relative dimensions may be used.

DETAILED DESCRIPTION

Figure 1:
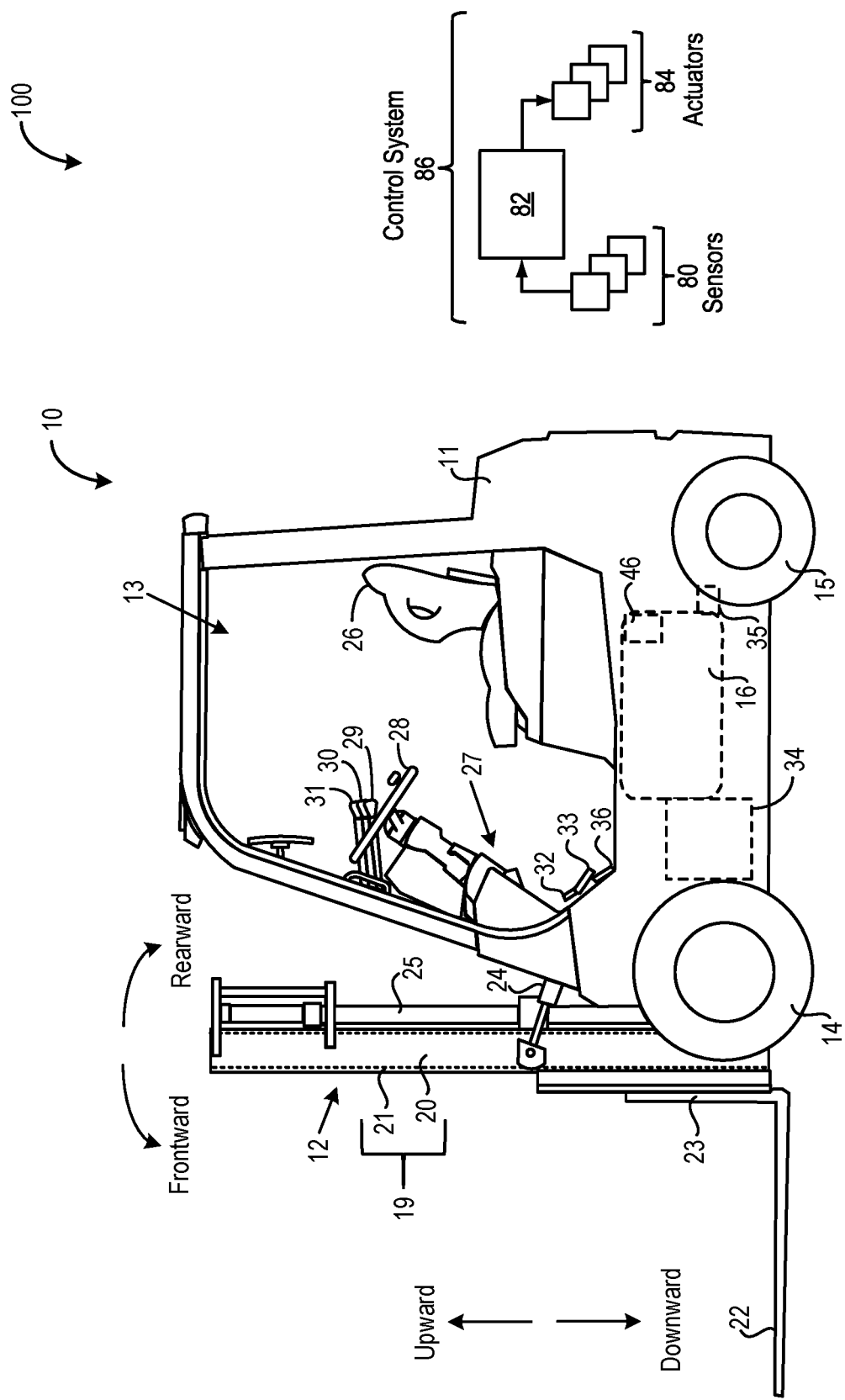
FIG. 1 shows an example schematic of a forklift powered by an electric motor.
Figure 6:
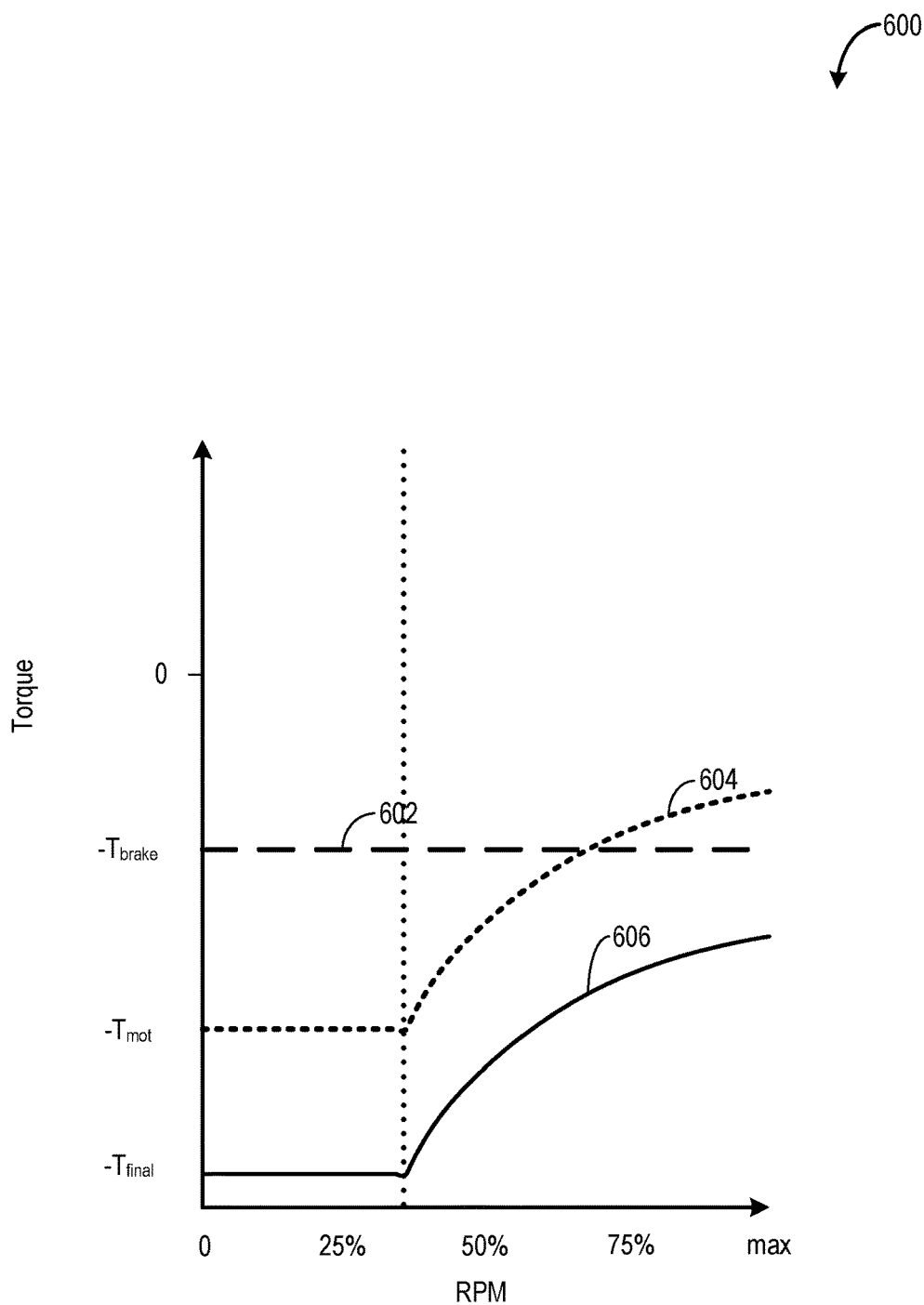
FIG. 6 shows a first example plot of brake torque applied from the electric motor and parking brake for vehicle deceleration.
Figure 7:
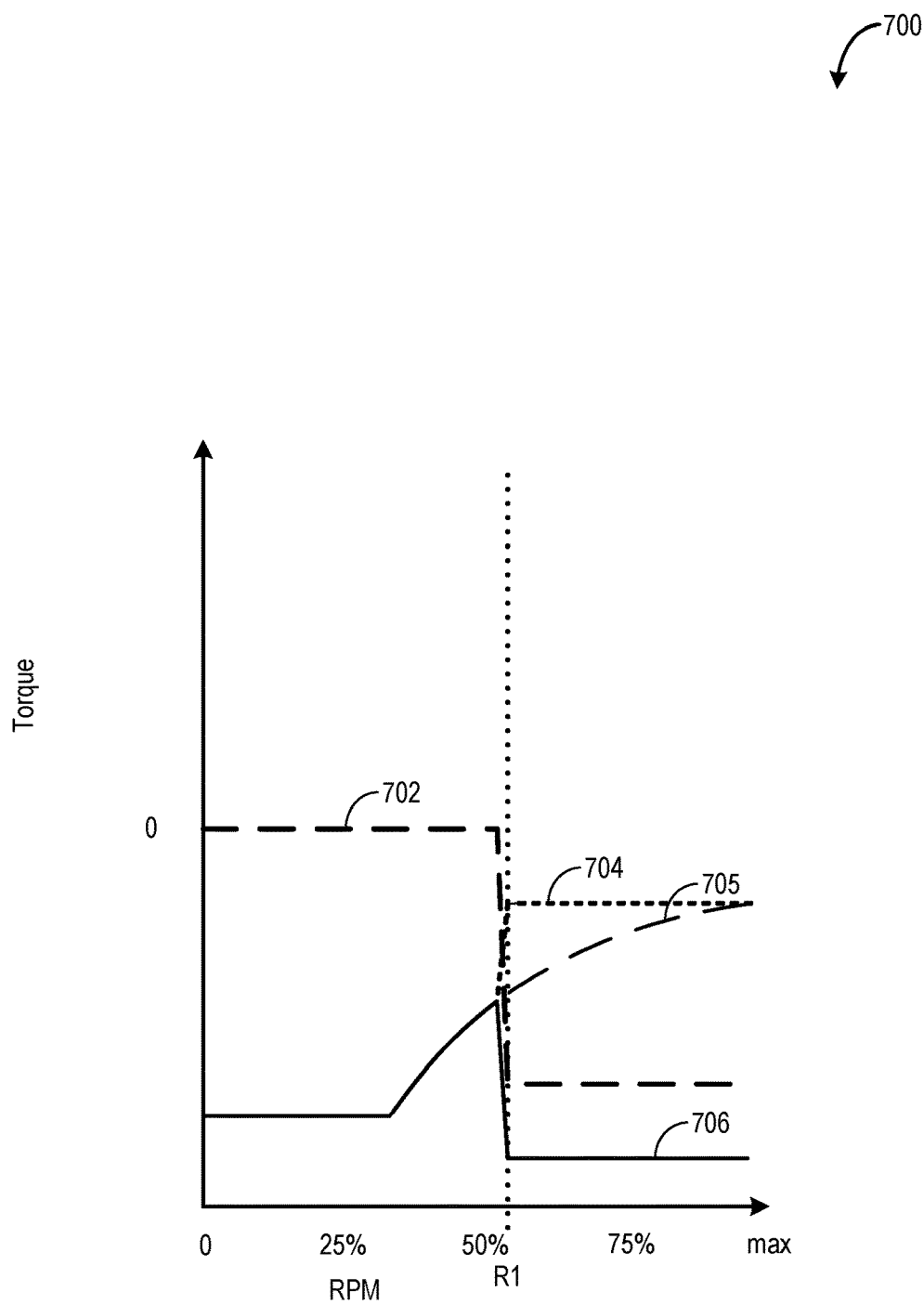
FIG. 7 shows a second example plot of brake torque applied from the electric motor and parking brake for vehicle deceleration.
Figure 8:
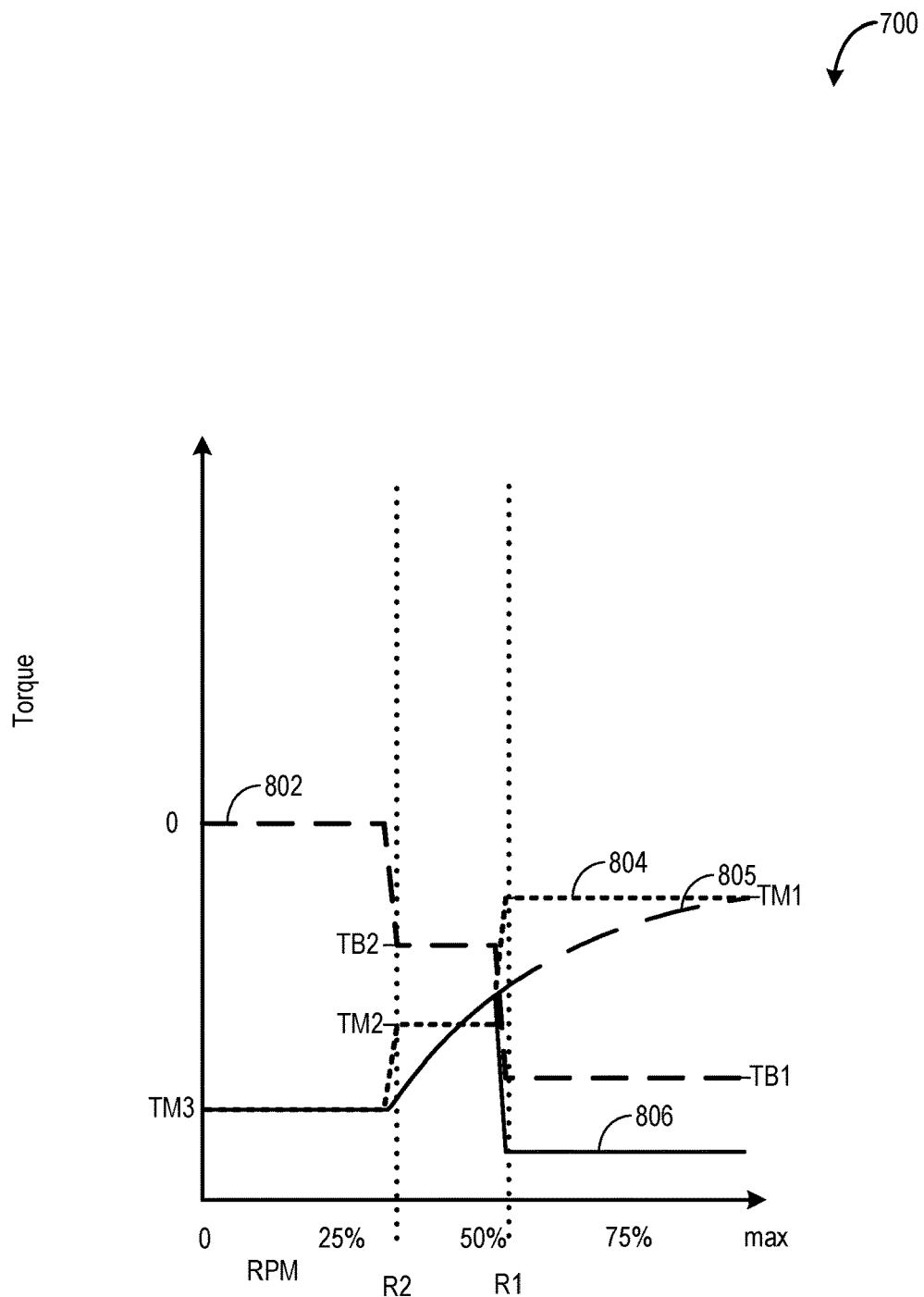
FIG. 8 shows a third example plot of brake torque applied from the electric motor and parking brake for vehicle deceleration.

The following description relates to systems and methods for providing a braking force in a vehicle via combined actuation of an electric motor and a parking brake. The vehicle may be a forklift operated via motor torque, as shown in FIG. 1. The vehicle may include a parking brake capable of being actuated at maximum and intermediate output levels, providing varying degrees of brake torque. A vehicle control system, as shown in FIG. 1, may be configured to perform a variety of control routines, such as the routines of FIGS. 3-5B, to coordinate operation of the electric motor and the parking brake to provide a desired brake torque to decelerate the vehicle. Example plots of brake torque from each of the electric motor and parking brake, when the vehicle is operated under different control routines for vehicle deceleration, are shown in FIGS. 6-8.

FIG. 1 shows an example schematic 100 of a forklift 10. The example schematic 100 of the forklift 10 and the description of FIG. 1 are adapted from U.S. Pat. No. 11,541,290. As shown in FIG. 1, the forklift 10 includes a loading device 12 at a front portion of a vehicle body 11. A cab 13 is formed in a center portion of the vehicle body 11. Drive wheels (front wheels) 14 are located in front and lower portions of the vehicle body 11, and steered wheels (back wheels) 15 are provided in rear and lower portions of the vehicle body 11. Both the drive wheels 14 and the steered wheels 15 may contact a driving surface. A transmission 34 may also be mounted on the vehicle body 11. An electric motor 16 may couple to the drive wheels 14 and the steered wheels 15 by way of the transmission 34. The forklift 10 of this embodiment may be an electric motor type, in which the wheels 14, 15 are driven by the electric motor 16. That is, the forklift 10 travels by using the power of the electric motor 16.

Transmission 34 may include a gear set having one or more gears. In one example, the transmission 34 may include a single speed transmission system with a single gear. In another example, the transmission 34 may include a multi speed transmission system with a two or more gears. For each of the single speed transmission system and the multi speed transmission system, the speed of the forklift may be directly proportional to the speed (RPM) of the electric motor. Further, various additional components may be included, such as a final drive unit, etc. In the depicted embodiment, the motor may be a battery-powered electric motor wherein electric motor 16 is powered by battery 46. Other energy storage devices that may be used to power electric motor 16 include a capacitor, a flywheel, a pressure vessel, etc. An energy conversion device, such as an inverter, may be configured to convert the DC output of battery 46 into an AC output for use by electric motor 16. Electric motor 16 may be operated as a motor, to provide positive torque to propel the forklift 10 during forklift operation such as during acceleration. Electric motor 16 may also be operated in a regenerative mode, that is, as a generator, to absorb energy from vehicle motion and convert the absorbed energy to an energy form suitable for storage in battery 46.

During operation of the electric motor 16 in the regenerative mode, a negative torque is applied by the electric motor 16 which may be used as braking force on the drive wheels 14 and steered wheels 15. Specifically, excess kinetic energy corresponding to the excess vehicle speed (that is, the difference between an estimated vehicle speed and a desired vehicle speed) is converted to, and stored as, electrical energy in the battery 46 coupled to the electric motor 16. In this way, by using the negative power from the electric motor 16, it is possible to decelerate and stop the forklift.

The loading device 12 will now be described. A multi-stage (two-stage in this embodiment) mast assembly 19 may be provided at a front portion of the vehicle body 11. The mast assembly 19 may include a pair of left and right outer masts 20 and a pair of left and right inner masts 21. A pair of left and right forks 22, herein also referred to as "loading attachment" may be attached to the mast assembly 19 by means of a lift bracket 23. A hydraulic tilt cylinder 24 may be coupled to each outer mast 20 to tilt the mast assembly 19, including the pair of left and right forks 22, in a frontward and a rearward direction, relative to the vehicle body 11. Hydraulic lift cylinders 25 may be coupled to each inner mast 21. The hydraulic lift cylinders 25 lift and lower the forks 22 with respect to the vehicle body, that is, move the forks 22 in an upward and a downward direction, relative to the vehicle body 11.

A driver's seat 26, on which a driver is seated, is positioned in the cab 13. Also, an instrument panel 27 may be positioned in a front portion of the cab 13. On the instrument panel 27, a steering wheel 28, a lift lever 29, a tilt lever 30, and a drive instructing section, including an advance/reverse lever, herein referred to as "direction lever" 31 may be provided. The steering wheel 28 is used for changing the steered angle of the steered wheels 15. The lift lever 29 is operated for lifting or lowering the forks 22, and the tilt lever 30 is operated for tilting the mast assembly 19, as described above. When the lift lever 29 is operated, the hydraulic lift cylinders 25 may be actuated in accordance with the direction of the operation, as in a lifting direction or lowering direction in the upward or downward direction, respectively, so that the inner masts 21 are slid along the outer masts 20. Accordingly, the forks 22 are lifted or lowered. When the tilt lever 30 is operated, the hydraulic tilt cylinders 24 may be actuated (extended or retracted) in accordance with the direction of the operation (forward tilting direction or rearward tilting direction), so that the mast assembly 19 is tilted with the forks 22. The advance/reverse lever 31 is operated for instructing the traveling direction of the vehicle (in this embodiment, advancing direction or reversing direction).

On the floor of the cab 13, a vehicle acceleration section, which is an accelerator pedal 32, an inching operation section, which is an inching pedal 33, and a braking operation section, which is a brake pedal 36, may be provided. The accelerator pedal 32 may be operated for instructing acceleration (driving) of the vehicle. The inching pedal 33 may be operated for partially engaging the clutches of the transmission 34 when manually operating the vehicle to slowly travel during loading. The brake pedal 36 may be operated for applying braking force to the vehicle.

Figure 2:
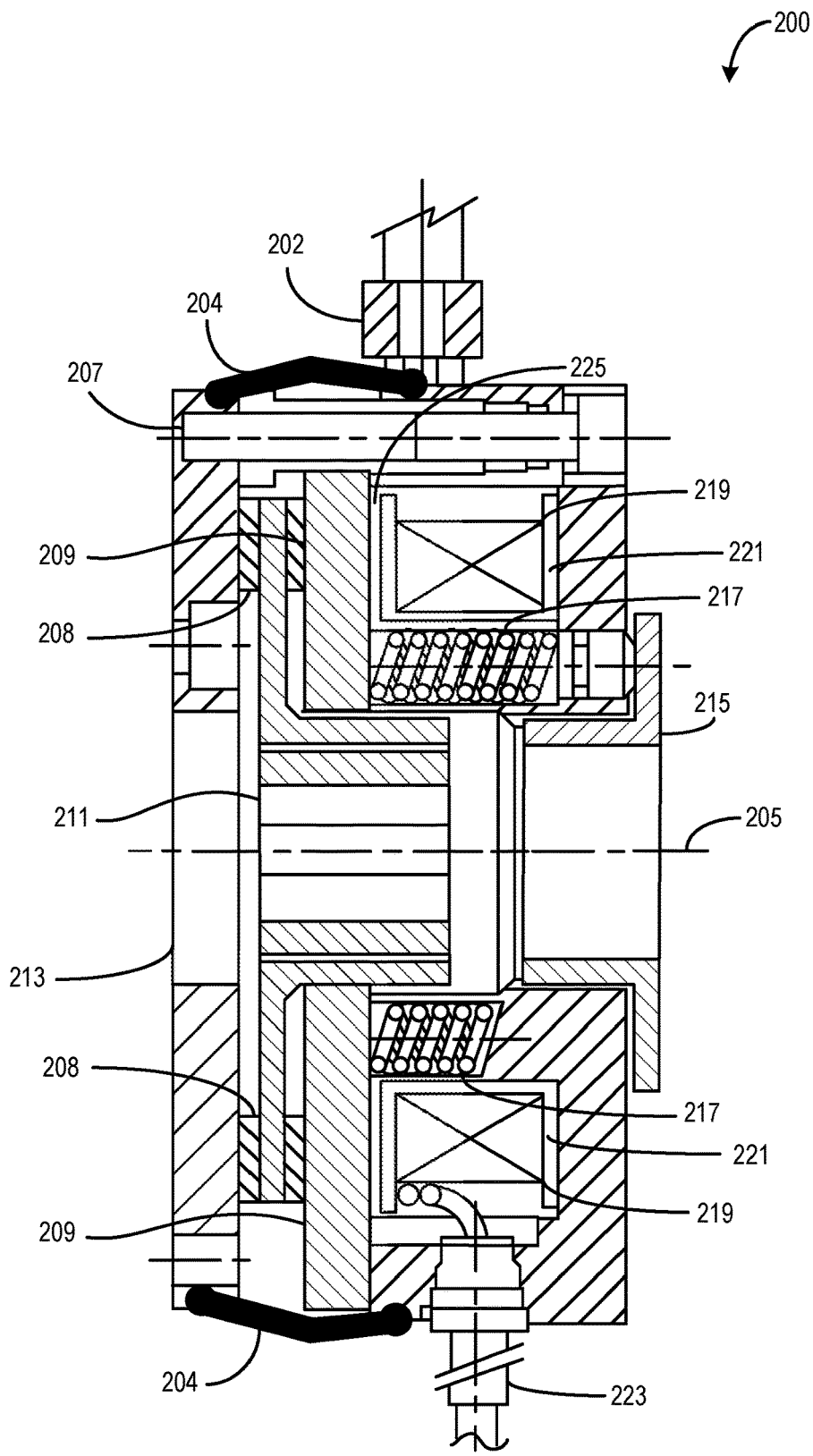
FIG. 2 shows an example schematic of a parking brake.

A parking brake 35 may be coupled to the drive wheels 14 and steered wheels 15 to provide brake torque to the wheels 14, 15 to decelerate and stop the forklift. The parking brake 35 may also be maintained in an engaged position when the wheels 14, 15 of the forklift 10 are stationary. Upon an indication by a forklift operator, such as the operator removing their foot from the accelerator pedal 32 so that the accelerator pedal 32 is disengaged and engaging the brake pedal 36 to decelerate or stop the forklift, negative torque from the electric motor 16 may be applied in combination with negative torque from the parking brake 35 to decelerate and stop the vehicle within a desired duration. In one example, the parking brake 35 may be applied to provide a constant negative torque which may be the maximum applicable torque or an intermediate negative torque between the maximum applicable torque and zero. In another example, the torque provided by the parking brake 35 may be modulated, where the level of negative torque provided by the parking brake 35 changes relative to vehicle speed. Details of a structure of an example parking brake are shown in FIG. 2.

During braking, the parking brake 35 may be applied in conjunction with negative torque from the electric motor 16 in order to provide braking. In particular, a first negative torque from the parking brake 35 may be applied in conjunction with a second negative torque from the electric motor 16 until a speed of the forklift 10 reduces to a threshold speed, after which the parking brake 35 may be deactivated. Concurrent application of the first negative torque and the second negative torque may be in response to an indication of braking received when the speed of the forklift 10 is above a first threshold speed, the first threshold speed being above the aforementioned threshold speed. Upon the speed of the forklift 10 reaching below the first threshold speed, negative torque may be applied solely from the electric motor 16 without actuation of the parking brake 35.

The relative amount of negative torque as applied by the parking brake 35 vs the electric motor 16 may be varied upon the capabilities of the parking brake 35, the amount of braking required, etc. In one example, the first negative torque may be a maximum applicable torque from the parking brake 35, while the second negative torque may be lower than a maximum applicable torque from the electric motor 16. In another example, the first negative torque may be lower than the maximum applicable torque from the parking brake 35, and the second negative torque may be a maximum applicable torque from the electric motor 16. In yet another example, the first negative torque may be lower than the maximum applicable torque from the parking brake 35, and the second negative torque may be lower than the maximum applicable torque from the electric motor 16. In a further example, the first negative torque may be the maximum applicable torque from the parking brake 35, and the second negative torque may be the maximum applicable torque from the electric motor 16

In order to maintain a relatively constant amount of negative torque during the braking process, upon deactivating the parking brake 35, the second negative torque from the electric motor 16 may be adjusted to the maximum applicable torque from the electric motor 16 until braking is complete. Completion of braking may be in response to the speed of the vehicle reducing to zero or a tip-in of the accelerator pedal 32.

Returning to operation of the forklift 10, in the example embodiment given, the forklift 10 may be operated solely via torque from the electric motor 16, wherein the speed of the forklift 10 may be directly proportional to the speed of the electric motor 16. However, other embodiments may be applicable, and the forklift 10 may include a hybrid propulsion system including a combustion engine and the electric motor.

The forklift 10 may further include control system 86. Control system 86 is shown receiving information from a plurality of sensors 80 and sending control signals to a plurality of actuators 84. As one example, the plurality of sensors 80 may include various pressure and temperature sensors, accelerator positions sensor, and brake pedal position sensor etc. The control system may also send control signals to the plurality of actuators 84 based on input received from a vehicle operator via one or more buttons on a vehicle dashboard. The various actuators may include, for example, the gear set, the parking brake, etc. The control system 86 may include a controller 82. The controller 82 may receive input data from the various sensors or buttons, process the input data, and trigger the actuators in response to the processed input data based on instruction or code programmed therein corresponding to one or more routines. Example control routines are described herein with regard to FIGS. 3-5B.

FIG. 2 shows an example schematic of a parking brake 200. A cross section of the parking brake 200 is shown, taken along a radially aligned plane, where the radial direction is any direction perpendicular to the central axis 205. The parking brake may be an example of the parking brake 35 of FIG. 1. The parking brake 200 shown is an electrically released spring-set brake.

Parking brake 200 may include a friction plate 208, which may be a disc extending radially outwards from the central axis 205, and may be affixed to and extend radially outwards from a splined center hub 211. Additionally, the friction plate 208 may be in face-sharing contact with a friction flange 213 on one face of the friction plate 208. The friction flange 213 may extend radially outwards form the central axis 205. The splined center hub 211 may be coupled to a shaft (not shown) of an electric motor, such as electric motor 16 of FIG. 1, allowing the splined center hub 211, the friction plate 208, and the friction flange 213 to co-rotate about the central axis 205 during normal operation of the electric motor. An armature plate 209 may be maintained in face-sharing contact with a friction plate 208 on an opposite face of the friction plate 208. Correspondingly, the friction plate 208 may have frictional surfaces on both the face facing the friction flange 213 and the opposite face facing the armature plate 209, allowing for greater brake torque, as compared to a parking brake including a frictional surface on one face of a friction plate facing an armature plate 209.

Without the application of a voltage via a voltage source 223 to the parking brake 200, the friction plate 208 may be in contact with both the armature plate 209 and the friction flange 213, and an air gap 225 may be maintained between the armature plate 209 and an insulating shell 221 encasing a plurality of conductive coils 219. Additionally, the armature plate 209 may be compressed against the friction plate 208 by a set of compression springs 217, which may apply force to a face of the armature plate 209 opposite the face in contact with the friction plate 208. Thus, without the application of a voltage to the parking brake 200, the parking brake 200 may be engaged in a braking mode, applying a negative torque to the electric motor through face-sharing contact of the friction plate 208 and the armature plate 209. The engagement of negative torque from the parking brake 200 may reduce or prevent the friction plate 208, the splined center hub 211 and the friction flange 213 from co-rotating in response to a torque applied by the electric motor. In the current embodiment shown, the set of compression springs 217 contains two springs. Upon application of a voltage (e.g. a DC voltage) to the parking brake 200, current may circulate through the plurality of conductive coils 219 in order to generate an electromagnetic field. The application of the electromagnetic field may then pull the armature plate 209 to move in a direction parallel to the central axis 205 to be in face-sharing contact with the insulating shell 221, reducing a distance of the air gap 225 between the armature plate 209 and the insulating shell 221 to zero, and opening up an air gap between the friction plate 208 and the armature plate 209. Thus, upon application of a voltage to the plurality of conductive coils 219 of the parking brake 200, the armature plate 209 may be released from the friction plate 208, thus releasing the brake.

Additionally, parking brake 200 may optionally include a manual release 202 and a dust cover 204, the dust cover 204 protecting the friction plate 208 and the armature plate 209 from degradation. The parking brake 200 may be mounted to a surface (e.g. to the electric motor) via a mounting screw 207. Further, the negative torque applied by the parking brake 200 to the electric motor may adjusted via a torque adjuster 215. The torque adjuster 215 may be in contact with compression springs 217, and shifted longitudinally along the central axis 205 in order to adjust a compression level of the compression springs 217, thus adjusting the brake torque capacity of the armature plate 209 in contact with the friction plate 208 during braking.

In this way, the systems of FIGS. 1-2 provide for an electric motor coupled to an energy storage device providing positive and negative torque to wheels of the vehicle, a parking brake able to apply a varying range of negative torques to the wheels of the vehicle, and a controller storing instructions in non-transitory memory that, when executed, cause the controller to: in response to an indication of braking, apply negative torque from each of the electric motor and the parking brake simultaneously.

While operation of the parking brake 200 is described in relation to the forklift 10 of FIG. 1, other example embodiments of vehicles which employ parking brake 200 may be used. In another example embodiment, the vehicle utilizing parking brake 200 may be a reach truck including two front wheels and a single back wheel, whereby traction may be applied from the parking brake 200 to the single back wheel, according to the routines of FIGS. 3-5B.

Figure 3:
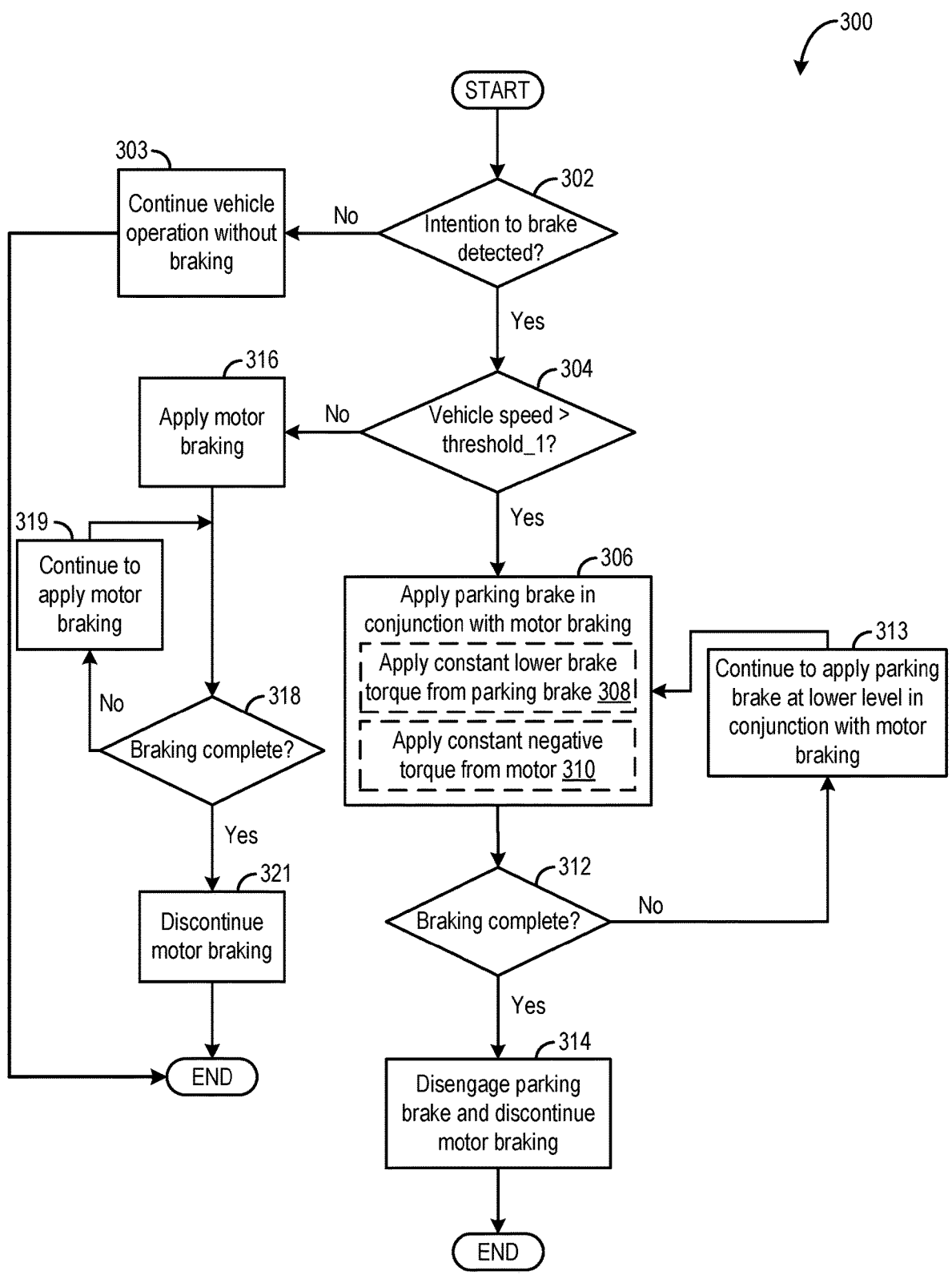
FIG. 3 shows a first flow chart illustrating a first example routine to operate the electric motor with the parking brake.

FIG. 3 shows a first example method 300 to operate an electric motor (such as electric motor 16 in FIG. 1) with a parking brake (such as parking brake 35 in FIG. 1) in a vehicle (such as the forklift 10 in FIG. 1). Actuation of the electric motor and the parking brake may be coordinated upon indication of braking from an operator. Method 300 and all other methods described herein will be described in reference to the systems described herein and with regard to FIGS. 1-2, but it should be understood that similar methods may be applied to other systems without departing from the scope of this disclosure. Method 300 and all other methods described herein may be carried out by control system 86, and may be stored at the controller 82 in non-transitory memory. Instructions for carrying out method 300 and all other method described herein may be executed by the controller 82 in conjunction with signals received from sensors of the vehicle system, such as the sensors described above with reference to FIG. 1. The controller may employ actuators of the vehicle system to adjust operation of the vehicle, according to the methods described below.

At 302, the method may include determining if an intention to brake has been indicated by an operator. As an example, the operator may indicate an intention to brake such as to decelerate to come to a complete stop via application of force on a brake pedal, releasing force on an accelerator pedal, and actuation of a joystick or switch. In an autonomous vehicle, the intention to brake may be determined by the controller based on the travel route, traffic, and road characteristics. If it is determined that an intention for braking is not indicated, at 303, vehicle operation may be continued without applying negative torque from the electric motor and/or the parking brake for braking. If it is determined that an intention to brake has been indicated, it may be inferred that the current speed of the vehicle is desired to be reduced and that a vehicle stop within a desired stopping distance may be requested. The method may proceed to 304.

At 304, the routine includes determining if the speed at which the vehicle is operating is greater than a first threshold speed (threshold 1). The threshold speed may be dynamically calibrated as a function of one or more of a desired vehicle stopping distance, a motor torque at time of indication of braking, a motor speed (RPM) at the time of indication of braking, characteristics of the parking brake, and the vehicle drive cycle.

The desired distance to stop may be calculated to occur within 1-3 seconds of the stop request. Given the characteristics of the electric motor, the maximum motor torque (positive or negative) may be lower at higher RPMs relative to the maximum motor torque at lower RPMs. Therefore, at lower motor RPMs, the motor can provide a higher negative torque for stopping the vehicle within the desired distance relative to the negative torque generated at higher RPMs. The characteristics of the parking brake may include the amount of energy the brake may be able to dissipate at a certain frequency of braking operation before it starts suffering from undesired wear. The energy dissipation capacity of the brake may be inversely proportional to the number of braking actions per hour, such as, for example, the energy dissipation limit of the brake may decrease as the number of braking events increases per hour over the course of the drive cycle. Therefore, during a drive cycle, as the number of braking events increases, the negative torque provided by the parking brake may decrease in order to reduce wear of the brake.

If the vehicle speed is lower than the first threshold speed, the negative torque provided solely by the electric motor may be sufficient to decelerate and stop the vehicle within the desired stopping distance. If the vehicle speed is higher than the first threshold speed, negative torque from the electric motor may be supplemented with negative torque from the parking brake to decelerate and stop the vehicle within the desired stopping distance. Since the negative torque provided by the parking brake is not the sole torque source for vehicle deceleration, the amount of negative torque provided by the parking brake may not cause mechanical wear in the brake. Also, since the parking brake supplements negative torque applied by the electric motor, a smaller sized electric motor may suffice to provide the negative torque needed to stop the vehicle within the desired stopping distance.

If it is determined that the vehicle speed is lower than the first threshold speed, at 316, motor braking may be applied and the entire brake torque desired for decelerating and/or stopping the vehicle may be provided by the electric motor. In one example, the magnitude of negative torque applied by the electric motor may be constant between the time of indication of braking and the vehicle stopping (braking duration). The magnitude of negative torque may be a function of vehicle speed at the time of indication of braking. In another example, the magnitude of negative torque applied by the electric motor may be adjusted such as progressively decreased over the braking duration as the vehicle speed reduces. The parking brake may remain disengaged over the braking duration. As the negative torque is provided by the motor, the electric motor may be operated in a regenerative mode, that is, as a generator, to absorb energy from vehicle motion and convert the absorbed energy to an energy from suitable for storage in a battery.

At 318, the routine may include determining if the braking is complete. In one example, the braking may be completed upon the vehicle coming to a complete stop. In another example, braking may be inferred to be complete upon torque demand increasing, such as from the operator applying force on the accelerator pedal to resume acceleration of the vehicle after attaining a degree of declaration via the braking. If it is determined that the braking is not complete, and further deceleration is desired, at 319, motor braking may be continued and negative torque may continue to be applied from the electric motor. If it is determined that braking is complete, at 321, motor braking may be discontinued and negative torque may no longer be provided by the electric motor.

Returning to 304, if it is determined that the vehicle speed is higher than the first threshold speed, at 306, the parking brake may be applied in conjugation with motor braking to provide the entire brake torque desired for decelerating and/or stopping the vehicle. The concurrent application of the parking brake and the motor braking may include, at 308, applying a constant lower brake torque by the parking brake. The lower brake torque may be lower than the maximum possible negative torque applicable (intermediate level) from the parking brake. A constant level of negative torque may be applied over the braking duration. The lower brake torque may be 20%-70% of the maximum possible torque level. The maximum possible torque level may be based on the characteristics of the parking brake such as the amount of energy the brake is able to dissipate at the current frequency of braking operation. The maximum possible torque level may decrease with a decrease in the amount of energy the brake is able to dissipate at the current frequency of braking operation.

The magnitude of the negative torque applied by the parking brake may be a function of the vehicle speed and the electric motor RPM at the time of indication of braking. In one example, the magnitude of the negative torque applied by the parking brake may increase with an increase in each of the vehicle speed and electric motor RPM at the time of indication of braking.

The concurrent application of the parking brake and the motor braking may also include, at 310, applying a constant negative motor torque from the electric motor. The magnitude of negative torque may be a function of vehicle speed at the time of indication of braking and the negative torque applied by the parking brake. In one example, the magnitude of the negative torque applied by the electric motor may increase with an increase in the vehicle speed At 312, the routine may include determining if the braking is complete. As described above, completion of braking may be upon the vehicle coming to a complete stop or upon torque demand increasing such as the operator applying force on the accelerator pedal to resume acceleration of the vehicle after attaining a degree of declaration via the braking. If it is determined that the braking is not complete, and further deceleration is desired, at 313, application of parking brake at the lower level may be continued in conjugation with motor braking. If it is determined that braking is complete, at 314, the parking brake may be disengaged and motor braking may be discontinued, and negative torque may no longer be provided by the electric motor and/or the parking brake. In one example, upon the vehicle coming to a stop, the parking brake may be engaged to a maximum possible level to hold the vehicle in one position without movement of wheels of the vehicle (such as drive wheels 14 and steered wheels 15 of FIG. 1).

In this way, between an indication of braking and the vehicle coming to a stop, a constant level of first negative torque may be applied from the parking brake and a second level of negative torque may be applied from the electric motor. The first level of negative torque may be lower than a maximum possible negative torque applicable from the parking brake, and the second level of negative torque may be lower than another maximum possible negative torque applicable from the electric motor.

FIG. 6 shows a first example plot 600 of brake torque applied from the electric motor and parking brake for vehicle deceleration according to the method described in FIG. 3. The x-axis denotes the speed (RPM) of the electric motor powering the vehicle. As such, the speed of the vehicle may be directly proportional to the speed of the electric motor. The y-axis denotes a torque generated by the electric motor. As described above, the electric motor may generate a positive torque to facilitate vehicle acceleration or generate a negative torque during braking and deceleration. The first plot, line 602, shows a negative torque applied by the parking brake. The second plot, line 604, shows a negative torque applied by the electric motor. The third plot, line 606, denotes a resultant torque due to application of negative torque from the parking brake and the electric motor.

In this example, an indication of braking may be received at a vehicle speed which may correspond to the maximum motor RPM. Upon receiving an indication of braking, a constant negative torque ($-T_{brake}$) may be applied from the parking brake while concurrently, a negative torque ($-T_{mot}$) is being applied from the motor to facilitate deceleration of the vehicle. The negative torque applied by the electric motor may be lower at higher RPMs and may increase (become larger in magnitude) with a decrease in RPM. Upon the motor speed reaching below 50% of the maximum speed (shown in FIG. 6 at approximately 37% of the maximum speed), the negative torque applied by the motor may be constant until the motor stops (RPM reduces to zero). For the entire duration of negative torque application, the negative torque applied from the electric motor may be lower than the maximum possible torque applicable from the motor. The negative torque being applied to the vehicle wheels to decelerate the vehicle and to stop it is a sum ($-T_{final}$) of the negative torques being applied by the parking brake and the electric motor. By using a combination of two sources of providing negative torque, a lower level of torque may be provided by the parking brake, thereby reducing a possibility of wear of the parking brake.

Figure 4:
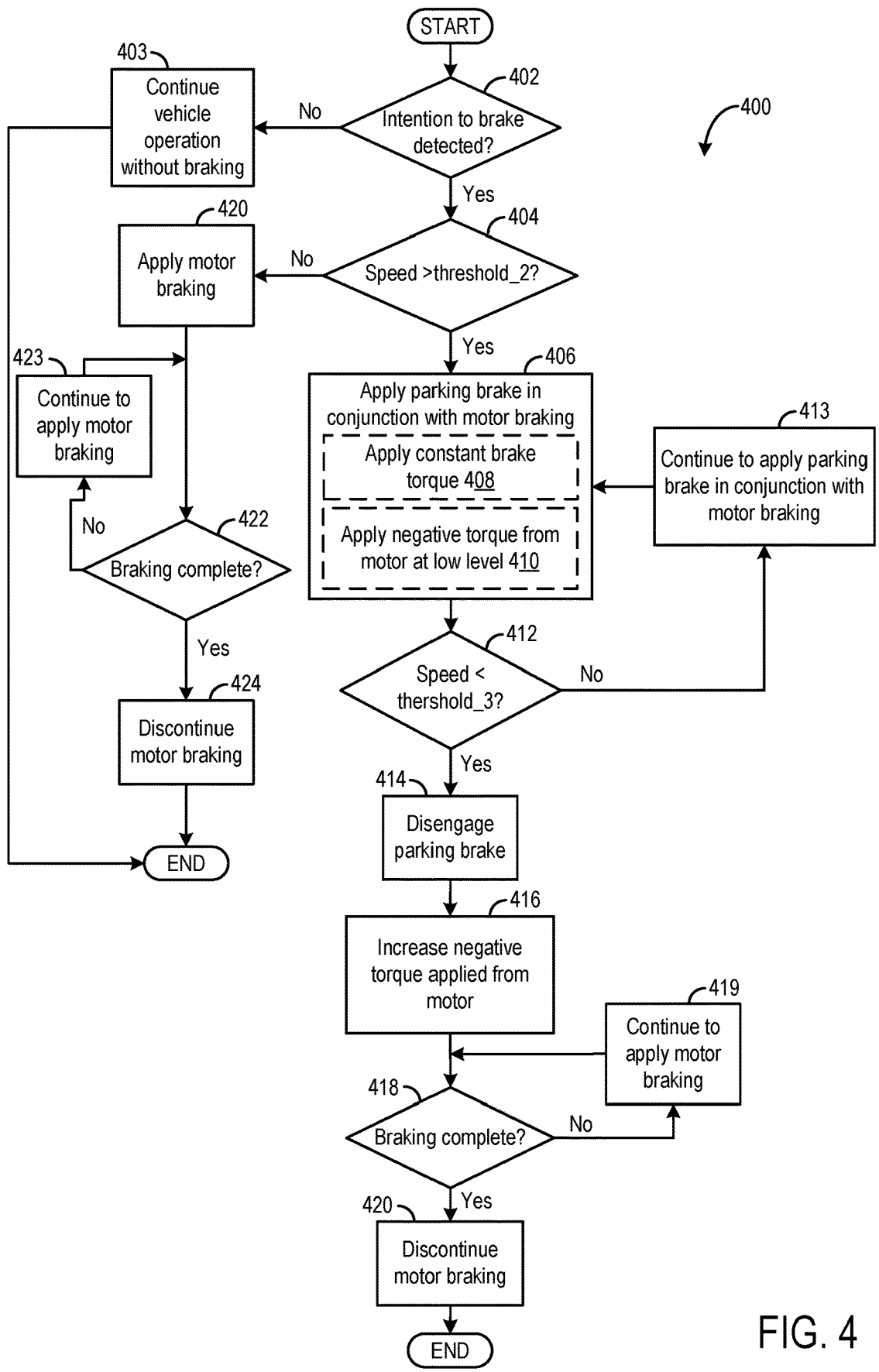
FIG. 4 shows a second flow chart illustrating a second example routine to operate the electric motor with the parking brake.

FIG. 4 shows a second example method 400 to operate an electric motor (such as electric motor 16 in FIG. 1) in conjunction with a parking brake (such as parking brake 35 in FIG. 1) in a vehicle (such as the forklift 10 in FIG. 1). In contrast to the first example method 300 of FIG. 3, the second example method 400 of FIG. 4 may include modular operation of the parking brake, such as activation/disengagement of the parking brake as the vehicle reaches certain speeds (to be discussed further herein). Actuation of the electric motor and the parking brake may be coordinated upon indication of braking from an operator.

At 402, the method may include determining if an intention to brake has been indicated by an operator. As an example, the operator may indicate an intention to brake such as to decelerate to come to a complete stop via application of force on a brake pedal, releasing force on an accelerator pedal, and actuation of a joystick or switch. In an autonomous vehicle, the intention to brake may be determined by the controller based on the travel route, traffic, and road characteristics. If it is determined that an intention for braking is not indicated, at 403, vehicle operation may be continued without applying negative torque from the electric motor and/or the parking brake for braking. If it is determined that an intention to brake has been indicated, it may be inferred that the current speed of the vehicle is desired to be reduced and the vehicle may be stopped within a desired stopping distance, and the method may proceed to 404.

At 404, the routine includes determining if the speed at which the vehicle is operating is higher than a second threshold speed (threshold_2). The threshold_2 speed may be dynamically calibrated as a function of one or more of a desired vehicle stopping distance, a motor torque at time of indication of braking, a motor speed (RPM) at the time of indication of braking, characteristics of the parking brake, and the vehicle drive cycle.

The desired distance to stop may be within 1-3 seconds. Given the characteristics of an electric motor, since the maximum motor torque (positive or negative) may be lower at higher RPMs, at lower motor RPMs, the motor can provide a higher negative torque for stopping the vehicle within the desired distance relative to the negative torque generated at higher RPMs. The characteristics of the parking brake may include the amount of energy the brake may be able to dissipate at a certain frequency of braking operation. The energy dissipation capacity of the brake may be inversely proportional to the number of braking actions per hour. Therefore, during a drive cycle, as the number of braking events increases, the negative torque provided by the parking brake may decrease.

If the vehicle speed is lower than the threshold_2 speed, the negative torque provided solely by the electric motor would be sufficient to decelerate and stop the vehicle within the desired stopping distance. If the vehicle speed is higher than the threshold_2 speed, negative torque from the electric motor may be supplemented with negative torque from the parking brake to decelerate and stop the vehicle within the desired stopping distance.

If it is determined that the vehicle speed is lower than the threshold_2 speed, at 420, the entire brake torque desired for decelerating and/or stopping the vehicle may be provided by the electric motor. In one example, the magnitude of negative torque applied by the electric motor may be constant between the time of indication of braking and the vehicle stopping (braking duration). The magnitude of negative torque may be a function of vehicle speed at the time of indication of braking. In another example, the magnitude of negative torque applied by the electric motor may be adjusted, such as progressively decreased over the braking duration as the vehicle speed reduces. The parking brake may remain disengaged over the braking duration. As the negative torque is provided by the motor, the electric motor may be operated in a regenerative mode, that is, as a generator, to absorb energy from vehicle motion and convert the absorbed energy to an energy form suitable for storage in a battery.

At 422, the routine may include determining if the braking is complete. In one example, the braking may be completed upon the vehicle coming to a complete stop. In another example, braking may be inferred to be complete upon torque demand increasing such as the operator applying force on the accelerator pedal to resume acceleration of the vehicle after attaining a degree of deceleration via the braking. If it is determined that the braking is not complete, and further deceleration is desired, at 423, motor braking may be continued and negative torque may be continued to be applied from the electric motor. If it is determined that braking is complete, at 424, motor braking may be discontinued and negative torque may no longer be provided by the electric motor.

Returning to 404, if it is determined that the vehicle speed is higher than the threshold_2 speed, at 406, the parking brake may be applied in conjugation with motor braking to provide the entire brake torque desired for decelerating and/or stopping the vehicle. The concurrent application of the parking brake and the motor braking may include, at 408, applying a constant brake torque with the park brake. In one example, the brake torque may be the maximum possible negative torque applicable from the parking brake. The maximum possible torque level may be based on the characteristics of the parking brake such as the amount of energy the brake is able to dissipate at the current frequency of braking operation. The maximum possible torque level may decrease with a decrease in the amount of energy the brake is able to dissipate at the current frequency of braking operation. The amount of energy the brake is able to dissipate is inversely proportional to the number of braking events preceding this braking event during the current drive cycle. In another example, the brake torque may be lower the maximum possible negative torque applicable from the parking brake. The lower brake torque may be 20%-70% of the maximum possible torque level. In yet another example, the brake torque from the parking brake may be modulated and decreased gradually as the vehicle speed decreases.

The concurrent application of the parking brake and the motor braking may also include, at 410, applying a negative motor torque from the electric motor at a lower level. The magnitude of negative torque applied at the lower level may be lower than the maximum possible negative torque applicable by the electric motor. The magnitude of the lower level of torque applied may be a function of vehicle speed at the time of indication of braking and the negative torque applied by the parking brake. In one example, the magnitude of the negative torque applied by the electric motor may decrease with a decrease in the vehicle speed and an increase in negative torque applied by the parking brake. In another example, the magnitude of the lower level of torque applied may be constant for the entire duration or part of the braking duration.

As the vehicle decelerates, at 412, the routine includes determining if the vehicle speed has reduced to a third threshold speed (threshold_3). The threshold_3 speed may be lower than the threshold_2 speed and the threshold_3 speed may be dynamically calibrated as a function of the current vehicle speed, the negative torque applied by the parking brake, and characteristics of the parking brake such as the energy dissipation limit of the parking brake at the current frequency of braking. In one example, the threshold_3 speed may reduce with an increase in the energy dissipation limit of the parking brake. Upon providing torque to slow the vehicle to the threshold_3 speed, the parking brake may reach its energy dissipation limit, and therefore may no longer be used to provide negative torque.

If it is determined that the vehicle speed has reduced to the threshold_3 speed, it may be inferred that negative torque from the parking brake may no longer be available. At 414, the parking brake may be disabled and negative torque application from the parking brake may be discontinued. At 416, the magnitude of negative torque applied from the electric motor may be increased to a higher level. The magnitude of the higher level of torque applied by the motor may be based on the threshold_3 speed. In one example, the magnitude of the negative torque applied by the electric motor may be the maximum possible negative torque that may be applied by the motor. In another example, the magnitude of the higher level of torque applied may change over the remaining braking duration, with the negative torque increasing with a decrease in motor speed. The negative torque applied by the motor may be constant over a portion of the remaining braking duration.

At 418, the routine may include determining if the braking is complete. As described above, completion of braking may be upon the vehicle coming to a complete stop, or upon torque demand increasing, such as the operator applying force on the accelerator pedal to resume acceleration of the vehicle after attaining a degree of deceleration via the braking. If it is determined that the braking is not complete, and further deceleration is desired, at 419, application of motor braking at the higher level may be continued. If it is determined that braking is complete, at 420, motor braking may be discontinued, and negative torque may no longer be provided by the electric motor and/or the parking brake. In one example, upon the vehicle coming to a stop, the parking brake may be engaged to a maximum possible level to hold the vehicle in one position without movement of the wheels.

FIG. 7 shows a second example plot 700 of brake torque applied from the electric motor and parking brake for vehicle deceleration according to the method described in FIG. 4. The x-axis denotes the speed (RPM) of the electric motor powering the vehicle. As such, the speed of the vehicle may be directly proportional to the speed of the electric motor. The y-axis denotes a torque generated by the electric motor. As described above, the electric motor may generate a positive torque to facilitate vehicle acceleration or generate a negative torque during braking and deceleration. The first plot, line 702, shows a negative torque applied by the parking brake. The second plot, line 704, shows a negative torque applied by the electric motor. The third plot, line 705, shows a maximum possible negative torque that could have been applied by the electric motor corresponding to the motor speed. The fourth plot, line 706, denotes a resultant torque due to application of negative torque from the parking brake and the electric motor.

In this example, an indication of braking may be received at a vehicle speed which may correspond to the maximum motor RPM. Upon receiving an indication of braking, until speed R1, a constant negative torque may be applied from the parking brake while concurrently, a constant negative torque is being applied from the motor to facilitate deceleration of the vehicle. As shown by line 704, the negative torque applied by the electric motor may be lower (smaller in magnitude) than the highest level of negative torque applicable, as shown by line 705. The level of negative torque applied by the parking brake may be the highest level of torque applicable by the parking brake, corresponding to the energy dissipation limit of the brake. The resultant negative torque from the parking brake and the electric motor may cause the vehicle to decelerate.

Upon the vehicle speed corresponding (directly proportional to) the motor speed reaching a threshold speed R1, the negative torque applied by the parking brake is disabled. In order to maintain a consistent level of braking, at speed R1, the negative torque applied by the electric motor is increased to the maximum applicable torque (line 705). The maximum applicable torque may increase with a decrease in RPM and may become constant at lower RPMs. After the suspension of parking brake application, the total negative torque applied on the vehicle wheels may be from the motor torque. In this way, by initially supplementing motor torque with torque from the parking brake, a smaller sized motor may be used to attain the desired deceleration while maintaining a stable level of braking.

Figure 5A:
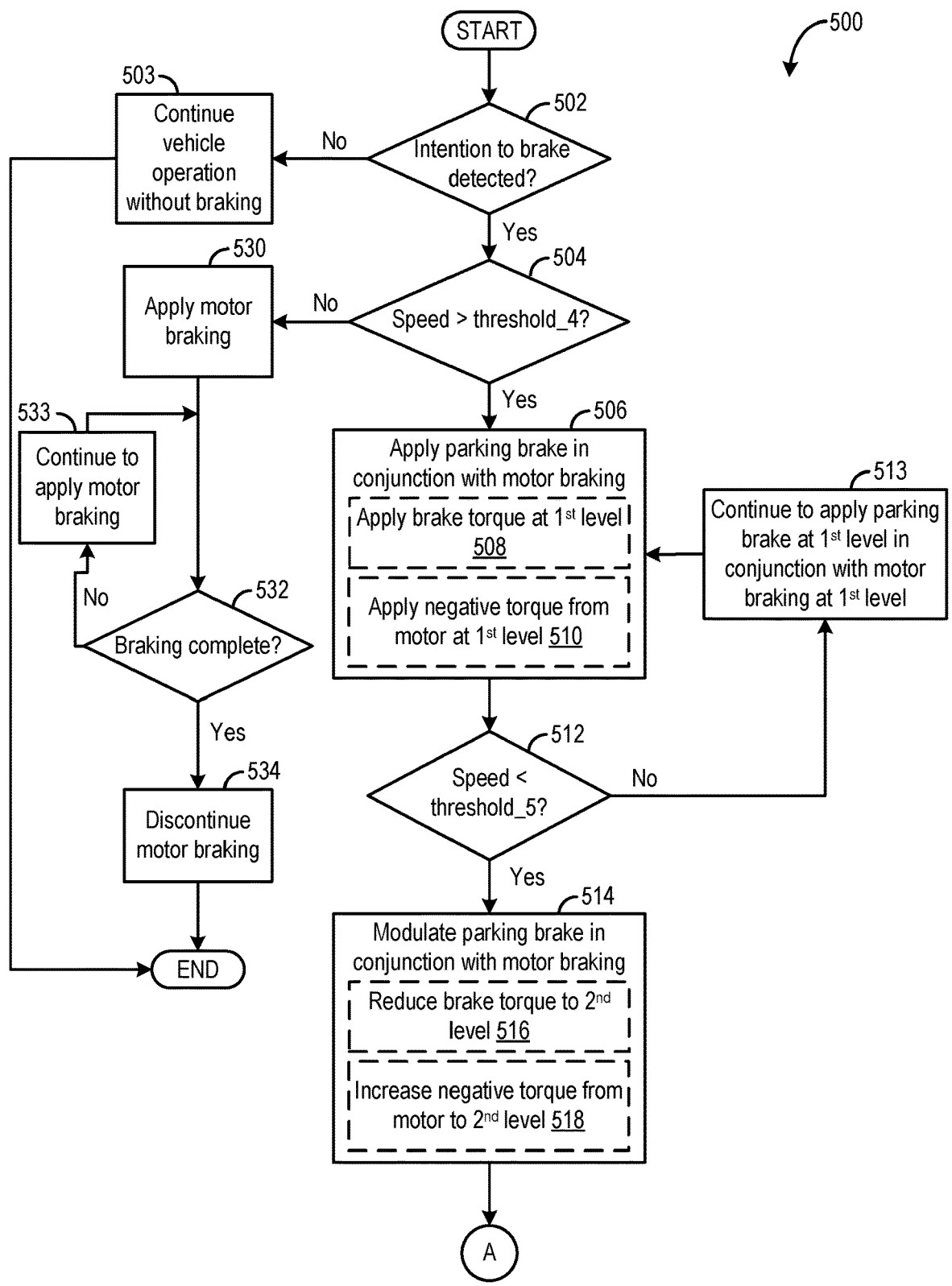
FIG. 5A-5B show a third flow chart illustrating a third example routine to operate the electric motor with the parking brake.
Figure 5B:
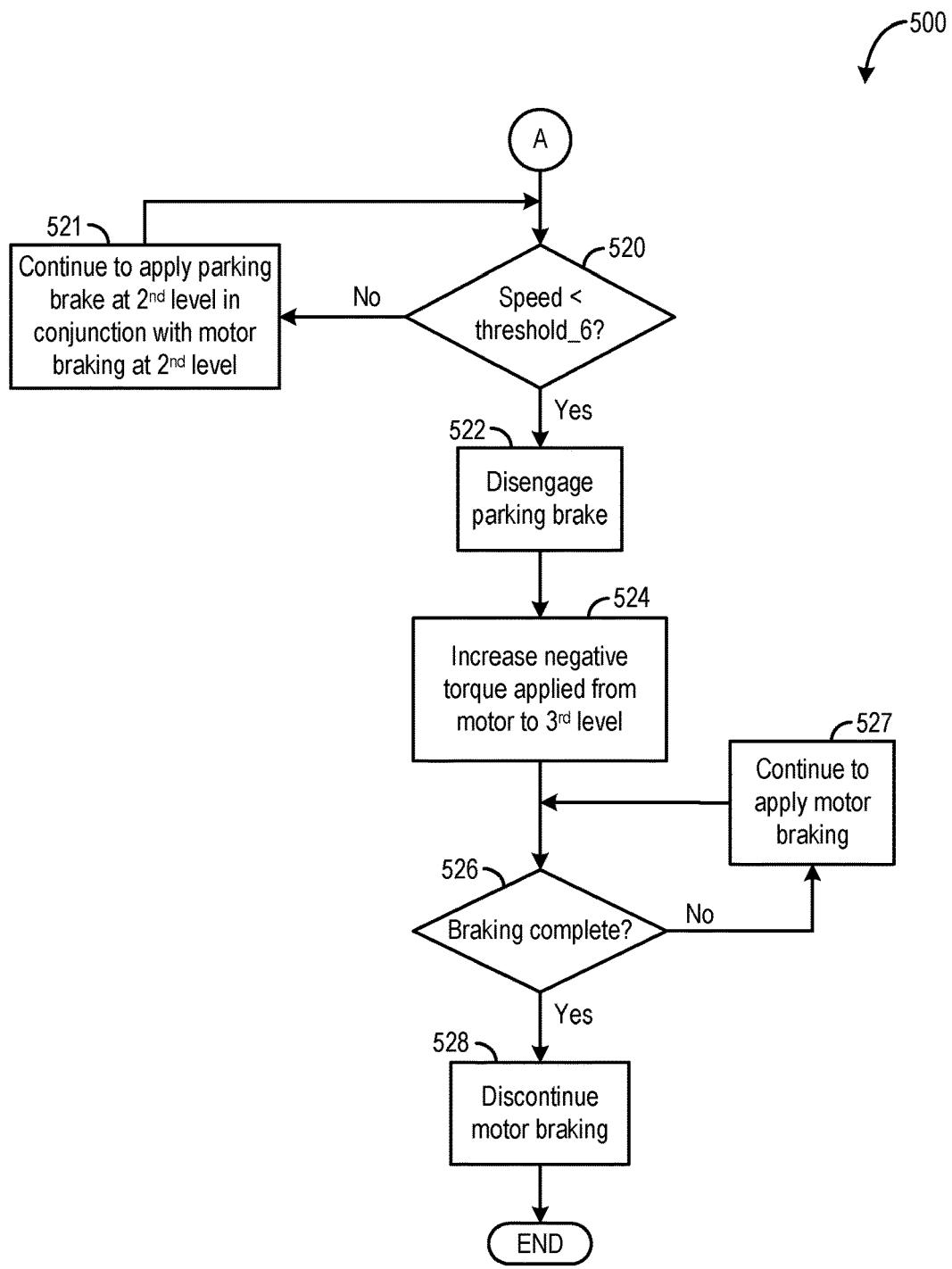

FIGS. 5A-5B show a third example method 500 to operate an electric motor (such as electric motor 16 in FIG. 1) with a parking brake (such as parking brake 35 in FIG. 1) in a vehicle (such as the forklift 10 in FIG. 1). Actuation of the electric motor and the parking brake may be coordinated upon indication of braking from an operator. In this example, the negative torque applied from the parking brake may be modulated and the magnitude of negative torque applied may be adjusted over the braking duration.

At 502, the method may include determining if an intention to brake has been indicated by an operator. As an example, the operator may indicate an intention to brake such as to decelerate to come to a complete stop via application of force on a brake pedal, releasing force on an accelerator pedal, and actuation of a joystick or switch. In an autonomous vehicle, the intention to brake may be determined by the controller based on the travel route, traffic, and road characteristics. If it is determined that an intention for braking is not indicated, at 503, vehicle operation may be continued without applying negative torque from the electric motor and/or the parking brake for braking. If it is determined that an intention to brake has been indicated, it may be inferred that the current speed of the vehicle is desired to be reduced and the vehicle may be stopped within a desired stopping distance and the method may proceed to 504.

At 504, the routine includes determining if the speed at which the vehicle is operating is higher than a fourth threshold speed (threshold_4). The threshold_4 speed may be a dynamically calibrated as a function of one or more of a desired vehicle stopping distance, motor torque at time of indication of braking, motor speed (RPM) at the time of indication of braking, characteristics of the parking brake, and the vehicle drive cycle. In one example, the threshold_4 speed may be substantially equal to the threshold_2 speed (as described in FIG. 4) and the threshold_1 speed (as described in FIG. 3).

The desired distance to stop may be within 1-3 seconds. Given the characteristics of an electric motor, since the maximum motor torque (positive or negative) may be lower at higher RPMs, at lower motor RPMs, the motor can provide a higher negative torque for stopping the vehicle within the desired distance relative to the negative torque generated at higher RPMs. The characteristics of the parking brake may include the amount of energy the brake may be able to dissipate at a certain frequency of braking operation. The energy dissipation capacity of the brake may be inversely proportional to the number of braking actions per hour. Therefore, during a drive cycle, as the number of braking events increases, the negative torque provided by the parking brake may decrease.

If the vehicle speed is lower than the threshold_4 speed, the negative torque provided solely by the electric motor would be sufficient to decelerate and stop the vehicle within the desired stopping distance. If the vehicle speed is higher than the threshold_4 speed, negative torque from the electric motor may be supplemented with negative torque from the parking brake to decelerate and stop the vehicle within the desired stopping distance.

If it is determined that the vehicle speed is lower than the threshold_4 speed, at 530, the entire brake torque desired for decelerating and/or stopping the vehicle may be provided by the electric motor. In one example, the magnitude of negative torque applied by the electric motor may be constant between the time of indication of braking and the vehicle stopping (braking duration). The magnitude of negative torque may be a function of vehicle speed at the time of indication of braking. In another example, the magnitude of negative torque applied by the electric motor may be adjusted such as progressively decreased over the braking duration as the vehicle speed reduces. The parking brake may remain disengaged over the braking duration. As the negative torque is provided by the motor, the electric motor may be operated in a regenerative mode, that is, as a generator, to absorb energy from vehicle motion and convert the absorbed energy to an energy form suitable for storage in a battery.

At 532, the routine may include determining if the braking is complete. In one example, the braking may be completed upon the vehicle coming to a complete stop. In another example, braking may be inferred to be complete upon torque demand increasing such as the operator applying force on the accelerator pedal to resume acceleration of the vehicle after attaining a degree of declaration via the braking. If it is determined that the braking is not complete, and further deceleration is desired, at 533, motor braking may be continued and negative torque may be continued to be applied from the electric motor. If it is determined that braking is complete, at 534, motor braking may be discontinued and negative torque may no longer be provided by the electric motor.

Returning to 504, if it is determined that the vehicle speed is higher than the threshold_4 speed, at 506, the parking brake may be applied in conjugation with motor braking to provide the entire brake torque desired for decelerating and/or stopping the vehicle. The concurrent application of the parking brake and the motor braking may include, at 508, applying a constant brake torque at a first level. In one example, the first level of brake torque may be the maximum possible negative torque applicable from the parking brake. The maximum possible torque level may be based on the characteristics of the parking brake such as the amount of energy the brake is able to dissipate at the current frequency of braking operation. The maximum possible torque level may decrease with a decrease in the amount of energy the brake is able to dissipate at the current frequency of braking operation. The amount of energy the brake is able to dissipate is inversely proportional to the number of braking events preceding this braking event during the current drive cycle. In another example, the first level of brake torque may be lower the maximum possible negative torque applicable from the parking brake. The first level of brake torque may be 60%-90% of the maximum possible torque level.

The concurrent application of the parking brake and the motor braking may also include, at 510, applying a negative motor torque from the electric motor at a first level. The first level of negative torque applied by the electric motor may be lower than the maximum possible negative torque applicable by the electric motor. The magnitude of the first level of torque applied by the electric motor may be a function of vehicle speed at the time of indication of braking and the first level of negative torque applied by the parking brake. In one example, the magnitude of the first level negative torque applied by the electric motor may decrease with a decrease in the vehicle speed and an increase in negative torque applied by the parking brake. In another example, the magnitude of the first level of torque applied may be constant for the entire duration or part of the braking duration.

As the vehicle decelerates, at 512, the routine includes determining if the vehicle speed has reduced to a fifth threshold speed (threshold_5). The threshold_5 speed may be lower than the threshold_4 speed and the threshold_5 speed may be dynamically calibrated as a function of the current vehicle speed, the first level of negative torque applied by the electric motor, the first level of negative torque applied by the parking brake, and characteristics of the parking brake such as the energy dissipation limit of the parking brake at the current frequency of braking. In one example, the threshold_5 speed may reduce with an increase in the energy dissipation limit of the parking brake.

If it is determined that the vehicle speed has reduced to the threshold_5 speed, it may be inferred that a lower degree of negative torque may be applied from the parking brake. At 514, the negative torque applied from the parking brake may be modulated in conjugation with motor braking to provide the entire brake torque desired for decelerating and/or stopping the vehicle. The application of the parking brake and the motor braking may include, at 516, reducing the negative torque applied from the parking brake from the first level to a second level, the second level being lower than the first level. In one example, the second level of brake torque may be based on the characteristics of the parking brake such as the amount of energy the brake is able to dissipate at the current frequency of braking operation. The amount of energy the brake is able to dissipate is inversely proportional to the number of braking events preceding this braking event during the current drive cycle. The second level of brake torque may be lower than the maximum possible negative torque applicable from the parking brake. The second level of brake torque may be 30%-70% of the maximum possible torque level.

In one example, the modulation of the negative torque applied from the parking brake in conjugation with motor braking may not be in discrete steps but, may be as a continuously changing curve. As an example, the negative torque applied from the parking brake may decrease proportional to the decrease in vehicle speed while the negative torque applied from the electric motor may increase proportional to the decrease in vehicle speed.

The concurrent application of the parking brake and the motor braking may also include, at 518, increasing the negative motor torque from the electric motor from the first level to the second level. The second level of negative torque applied may be lower than the maximum possible negative torque applicable by the electric motor but higher than the first level of negative torque applied from the motor. The magnitude of the second level of torque applied may be a function of the threshold_5 speed and the second level of negative torque applied by the parking brake. In one example, the magnitude of the second level of torque applied may be constant for the entire duration or part of the braking duration. By modulating the negative torque applied from the parking brake and the electric motor, the resultant level of negative torque applied to the vehicle wheels may be maintained at a substantially constant level, thereby causing a smoother braking and improving the driving experience of the vehicle.

In FIG. 5B, at 520, the routine includes determining if the vehicle speed has reduced to a sixth threshold speed (threshold_6). The threshold_6 speed may be lower than each of the threshold_5 speed and the threshold_4 speed. The threshold_6 speed may be dynamically calibrated as a function of the current vehicle speed, the second level of torque applied by the parking brake, and characteristics of the parking brake such as the energy dissipation limit of the parking brake at the current frequency of braking. In one example, the threshold_6 speed may reduce with an increase in the energy dissipation limit of the parking brake. Upon providing torque for deceleration up to the threshold_6 speed, the parking brake may reach its energy dissipation limit and therefore may no longer be used to provide negative torque.

If it is determined that the vehicle speed has reduced to the threshold_6 speed, it may be inferred that negative torque from the parking brake may no longer be available. At 522, the parking brake may be disabled and negative torque application from the parking brake may be discontinued. At 524, the magnitude of negative torque applied from the electric motor may be increased to a third level. The magnitude of the third level of torque applied by the motor may be based on the threshold_6 speed. In one example, the magnitude of the third level of negative torque applied by the electric motor may be the maximum possible negative torque that may be applied by the motor. In another example, the magnitude of the higher level of torque applied may be changed over the remaining braking duration with the negative torque increasing with a decrease in motor speed. The negative torque applied by the motor may be constant over a portion of the remaining braking duration.

At 526, the routine may include determining if the braking is complete. As described above, completion of braking may be upon the vehicle coming to a complete stop or upon torque demand increasing such as the operator applying force on the accelerator pedal to resume acceleration of the vehicle after attaining a degree of declaration via the braking. If it is determined that the braking is not complete, and further deceleration is desired, at 527, application of motor braking at the third level may be continued. If it is determined that braking is complete, at 528, motor braking may be discontinued, and negative torque may no longer be provided by the electric motor and/or the parking brake. In one example, upon the vehicle coming to a stop, the parking brake may be engaged to a maximum possible level to hold the vehicle in one position without movement of the wheels.

In this way, during a first condition, a positive torque may be applied from an electric motor to vehicle wheels while the parking brake is maintained inactive, and during a second condition, a first negative torque applied to the vehicle wheels from the parking brake may be modulated and a second negative torque applied to the vehicle wheels from the electric motor may be modulated. The first condition may include a tip-in of the accelerator pedal by an operator, and the second condition may include application of the parking brake by the operator.

Modulating the first negative torque from the parking brake may include during a speed of the vehicle being lower than a first threshold speed, maintaining the parking brake inactive, and during the speed of the vehicle being higher than the first threshold speed applying a first level of negative torque from the parking brake. Modulating the first negative torque from the parking brake may further include, in response to the speed of the vehicle reducing to a second threshold speed, decreasing the first negative torque from the first level to a second level, and then in response to the speed of the vehicle reducing to a third threshold speed, deactivating the parking brake. In this scenario, the first threshold is higher than the second threshold, and the third threshold is lower than the second threshold.

Modulating the second negative torque from the electric motor may also include, during the speed of the vehicle being lower than the first threshold speed, applying a third level of negative torque solely from the electric motor. Modulating the second negative torque from the electric motor further may further include, during the speed of the vehicle being higher than the first threshold speed, applying a fourth level of negative torque from the parking brake, the forth level lower than the third level. Modulating the second negative torque from the electric motor may further include, in response to the speed of the vehicle reducing to the second threshold speed, increasing the second negative torque from the forth level to a fifth level, and then in response to the speed of the vehicle reducing to the third threshold speed, further increasing the second negative torque from the fifth level to a sixth level.

FIG. 8 shows a third example plot 800 of brake torque applied from the electric motor and parking brake for vehicle deceleration according to the method described in FIGS. 5A-5B. The x-axis denotes the speed (RPM) of the electric motor powering the vehicle. As such, the speed of the vehicle may be directly proportional to the speed of the electric motor. The y-axis denotes a torque generated by the electric motor. As described above, the electric motor may generate a positive torque to facilitate vehicle acceleration or generate a negative torque during braking and deceleration. The first plot, line 802, shows a negative torque applied by the parking brake. The second plot, line 804, shows a negative torque applied by the electric motor. The third plot, line 805, shows a maximum possible negative torque that could have been applied by the electric motor corresponding to the motor speed. The fourth plot, line 806, denotes a resultant torque due to application of negative torque from the parking brake and the electric motor.

In this example, an indication of braking may be received at a higher vehicle speed which may correspond to the maximum motor RPM. Upon receiving an indication of braking, until speed R1, a constant negative torque TB1 may be applied from the parking brake while concurrently, a constant negative torque TM1 is being applied from the motor to facilitate deceleration of the vehicle. As shown by line 804, the negative torque TM1 applied by the electric motor may be lower than the highest level of negative torque applicable, as shown by line 805. The level of negative torque TB1 applied by the parking brake may be the highest level of torque applicable by the parking brake correspond to the energy dissipation limit of the brake. The resultant negative torque from the parking brake and the electric motor may cause the vehicle to decelerate.

Upon the vehicle speed corresponding (directly proportional to) the motor speed reaching a threshold speed R1, the negative torque applied by the parking brake may be reduced to TB2. In order to maintain a consistent level of braking, at speed R1, the negative torque applied by the electric motor is increased to TM2. The negative torque TM2 may be lower than the maximum applicable negative torque from the electric motor corresponding to the motor speed.

Upon the vehicle speed corresponding the motor speed reducing a threshold speed R2, the negative torque applied by the parking brake may be discontinued. In order to maintain a consistent level of braking, at speed R2, the negative torque applied by the electric motor is increased to the maximum applicable torque TM3. The maximum applicable torque may remain constant at the lower RPMs. After the suspension of parking brake application, the total negative torque applied on the vehicle wheels may be from the motor torque. In this way, by modulating the level of negative torque applied from the motor torque and the parking brake, a consistent level of braking may be provided with a smaller electric motor and with reduced mechanical wear of the parking brake.

The maximum applicable torque may increase with a decrease in RPM and may become constant at lower RPMs. After the suspension of parking brake application, the total negative torque applied on the vehicle wheels may be from the motor torque. In this way, by initially supplementing motor torque with torque from the parking brake, a smaller sized motor may be used to attain the desired deceleration while maintaining a stable level of braking.

Figure 9:
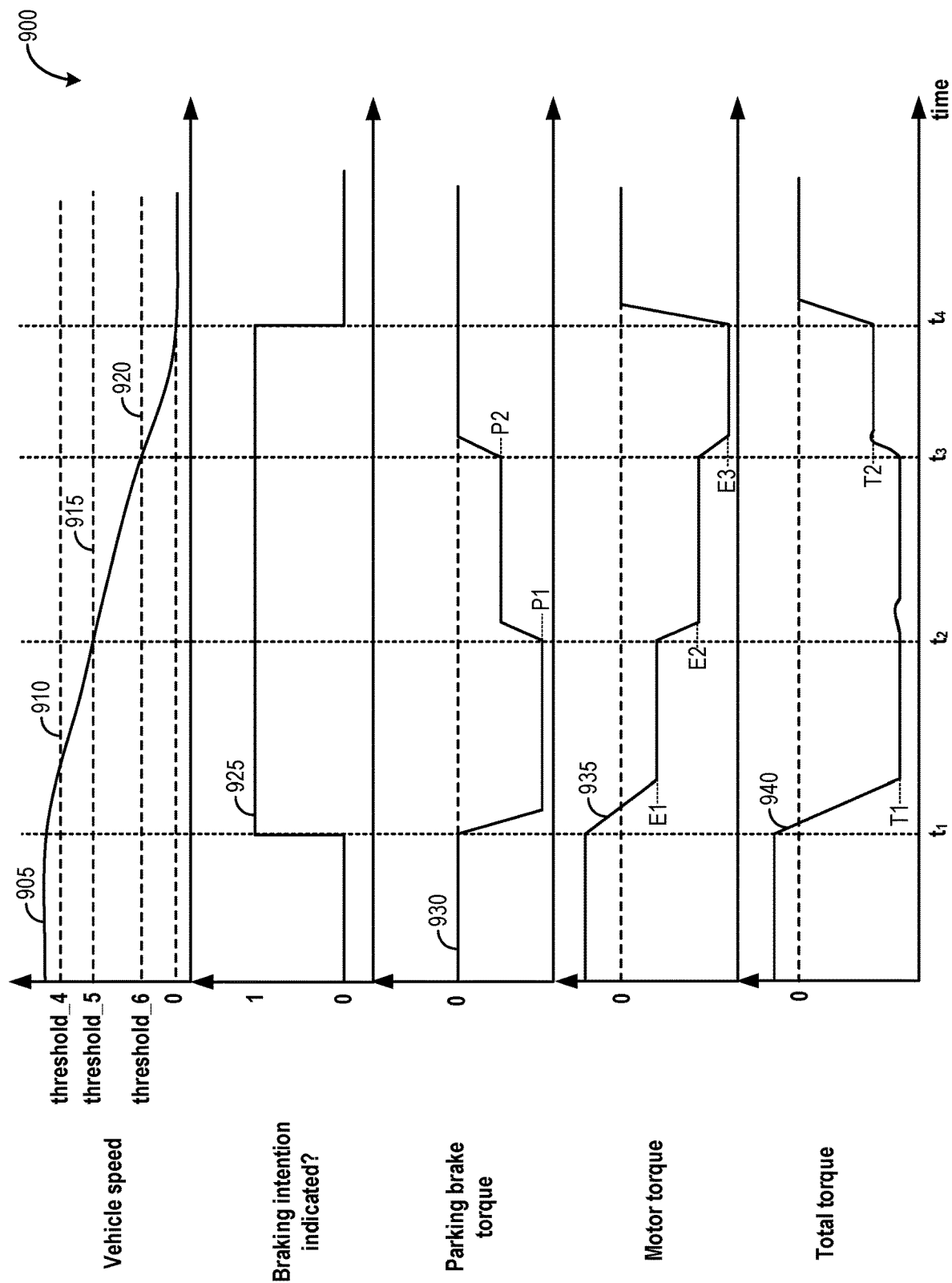
FIG. 9 shows a timeline of an example concurrent operation of the electric motor and the parking brake, according to the present disclosure.

FIG. 9 shows an example timeline 900 for applying a parking brake (such as parking brake 200 of FIG. 2) in conjunction with negative torque from an electric motor (such as electric motor 16 of FIG. 1) in order to decelerate a vehicle (such as forklift 10 of FIG. 1) in response to a request for braking from a vehicle operator. The example timeline 900 follows the third example method 500 of FIGS. 5A-5B. The horizontal (x-axis) denotes time and the vertical markers $t_1$-$t_4$ identify significant times in the diagnostic routines.

Example timeline 900 includes a plot 905 of the vehicle speed. Before any braking is implemented, the vehicle speed is directly proportional to the RPM of the electric motor. As part of the braking process, application of the parking brake and negative motor torque from the electric motor may be modulated during the braking process according to the speed of the vehicle. Speed threshold threshold_4 is indicated by dashed line 910. If the vehicle speed is greater than threshold_4 and an intention to brake is indicated by a vehicle operator, the parking brake is to be used at a first level in conjunction with negative torque from the electric motor being applied at a first level of negative torque. Speed threshold threshold_5 is indicated by dashed line 915. If the vehicle speed decreases below threshold_5 during the braking process, the negative torque applied by the electric motor is to be modulated from a first level to a second level, in conjunction with the parking brake modulating from a first level to a second level. A final speed threshold threshold_6 is indicated by dashed line 920. If the vehicle speed decreases below threshold_6 during the braking process, the parking brake is disengaged, and the negative torque from the electric motor is modulated to a third level of negative torque. A plot indicating a vehicle operator's intention to brake is given in plot 925. The modulation of the parking brake torque throughout the braking process is shown in plot 930. Correspondingly, the modulation of the torque of the electric motor is shown in plot 935, and a final plot showing the total negative torque applied throughout the braking process is given in plot 940.

Prior to $t_1$, the vehicle is operating at a speed above the speed threshold threshold_4. Correspondingly, the motor torque is operating at a positive level in proportion to the vehicle speed, the parking brake is inactive, and the there is no intention of a vehicle braking event indicated.

At $t_1$, an intention to brake is indicated. In response to the indication of an intention to brake, the negative torque applied by the parking brake is applied at a first level of brake torque P1. Similarly, in response to the indication of an intention to brake, the torque applied by the motor torque is adjusted from positive torque to negative motor torque. The negative torque applied by the electric motor is applied at a first level of motor torque E1 which is greater in magnitude than the first level of brake torque P1.

From $t_1$ to $t_2$, the electric motor torque ramps down (from the positive torque) and then maintains the first level E1 of negative motor torque as applied by the electric motor. Similarly, from $t_1$ to $t_2$, the parking brake torque is maintained at the first level of brake torque P1 as applied by the parking brake. Consequently, the total negative torque applied for parking is at level T1, which is the sum of the brake torque from the parking brake and the negative torque applied by the electric motor.

Correspondingly, from $t_1$ to $t_2$, in response to the application of negative motor by the electric motor and the parking brake, the vehicle decelerates and the vehicle speed decreases.

At $t_2$, the vehicle speed decreases to the speed threshold threshold_5. In response to the vehicle speed decreasing to the speed threshold threshold_5, the motor torque applied by the electric motor is adjusted from the first level E1 of negative motor torque to a second level E2 of negative motor torque, with the second level E2 of negative motor torque being greater in magnitude than the first level E1 of negative motor torque. Concurrently, in response to the vehicle speed decreasing to the speed threshold threshold_5, the brake torque applied by the parking brake is adjusted from the first level P1 of brake torque to a second level P2 of brake torque, with the second level P2 of brake torque being lower in magnitude than the first level P1 of brake torque. The second level P2 brake torque as applied by the parking brake and the second level E2 of negative motor torque as applied by the electric motor are modulated such that the total torque applied by the electric motor and the parking brake may be largely constant. From $t_2$ to $t_3$, the negative torque provided from the electric motor torque increases and then is maintained at the second level E2 of negative motor torque as applied by the electric motor. Also, from $t_2$ to $t_3$, the parking brake torque is reduced and then maintained the second level P2 of brake torque as applied by the parking brake. The total negative torque equalizes, and then maintains a constant level of total negative torque. Correspondingly, from $t_2$ to $t_3$, in response to the application of negative motor torque at a second level E2 by the electric motor and application of brake torque at a second level P2 by the parking brake, the vehicle speed decreases.

At $t_3$, the vehicle speed decreases to the speed threshold threshold_6. In response to the vehicle speed decreasing to the speed threshold threshold_6, the motor torque applied by the electric motor is increased from the second level E2 of negative motor torque to a third level of negative motor torque E3, with the third level of negative motor torque being greater in magnitude than each of the first level E1 and the second level E2 of negative motor torque. Concurrently, in response to the vehicle speed decreasing to the speed threshold threshold_6, the parking brake is disengaged, causing the negative brake torque to go to zero. From $t_3$ to $t_4$, the negative torque provided from the electric motor torque increases and then is maintained at the third level E3 of negative motor torque as applied by the electric motor. Also, from $t_3$ to $t_4$, the parking brake torque changes to zero torque due to disengaging of the parking brake. Due to the release of the parking brake and the modulation of the negative torque applied by the electric motor to the third level E3, the total negative torque increases slightly, to a level T2 of total negative torque, which is less in magnitude than the total level of negative torque T1. This is because the negative torque applied by the electric motor at the third level E3 is the maximum level of negative torque that the electric motor can apply, which does not fully compensate the release of the parking brake. Correspondingly, from $t_3$ to $t_4$, in response to the application of negative motor torque at the third level E3 by the electric motor, the vehicle speed decreases.

At $t_4$, in response to the vehicle speed reducing to zero (vehicle coming to a stop), it is inferred that braking is completed. In response to the braking being completed, the electric motor is disengaged, and correspondingly the motor torque goes to zero, and hence the total negative torque also goes to zero. Correspondingly, the braking intention indicator is switched off, and the method ends.

In this way, by utilizing the parking brake in conjunction with negative motor torque from an electric motor, efficient vehicle braking may be achieved. The technical effect of utilizing the parking brake in conjunction with negative motor torque from an electric motor during braking is that consistent brake torque may be achieved without increasing the size of the electric motor and/or adding an additional service brake. Hence, utilization of the parking brake in conjunction with negative motor torque from the electric motor for braking may reduce manufacturing cost and complexity. Further, if the torque level applied by the parking brake can be modulated, parking brake operation may be applied at different levels dynamically based on the speed of the vehicle during the braking process. This may further extend longevity of the parking brake, by utilizing the parking brake sparingly in order to comply with the energy dissipation limits therein.

The disclosure provides support for a method for a vehicle, comprising: concurrently applying a first negative torque from a parking brake and a second negative torque from an electric motor until a speed of the vehicle reduces to a threshold speed and then deactivating the parking brake. In a first example of the method, a concurrent application of the first negative torque and the second negative torque is in response to an indication of braking being received when the speed of the vehicle is above a first threshold speed. In a second example of the method, optionally including the first example, the method further comprises: in response to the indication of braking being received when the speed of the vehicle is below the first threshold speed, applying negative torque solely from the electric motor without actuation of the parking brake. In a third example of the method, optionally including one or both of the first and second examples, the threshold speed is a second threshold speed below the first threshold speed. In a fourth example of the method, optionally including one or more or each of the first through third examples, the first negative torque is a maximum applicable torque from the parking brake, and wherein the second negative torque is lower than a maximum applicable torque from the electric motor. In a fifth example of the method, optionally including one or more or each of the first through fourth examples, the first negative torque is lower than the maximum applicable torque from the parking brake, and wherein the second negative torque is lower than the maximum applicable torque from the electric motor. In a sixth example of the method, optionally including one or more or each of the first through fifth examples, the method further comprises: upon deactivating the parking brake, increasing the second negative torque from the electric motor to the maximum applicable torque from the electric motor until completion of braking. In a seventh example of the method, optionally including one or more or each of the first through sixth examples, the completion of braking is in response to one of the speed of the vehicle reducing to zero and a tip-in of an accelerator pedal. In an eighth example of the method, optionally including one or more or each of the first through seventh examples, the vehicle is a forklift operated via torque from the electric motor and wherein a speed of the vehicle is directly proportional to a speed of the electric motor.

The disclosure also provides support for a method for a vehicle, comprising: during a first condition, providing positive torque from an electric motor to vehicle wheels while maintaining a parking brake inactive, and during a second condition, modulating each of a first negative torque applied to the vehicle wheels from the parking brake and a second negative torque from the electric motor applied to the vehicle wheels. In a first example of the method, the first condition includes a tip-in of an accelerator pedal by an operator, and wherein the second condition includes application of brake by the operator. In a second example of the method, optionally including the first example, modulating the first negative torque from the parking brake includes during a speed of the vehicle being lower than a first threshold speed, maintaining the parking brake inactive, and during the speed of the vehicle being higher than the first threshold speed applying a first level of negative torque from the parking brake. In a third example of the method, optionally including one or both of the first and second examples, modulating the first negative torque from the parking brake further includes, in response to the speed of the vehicle reducing to a second threshold speed, decreasing the first negative torque from the first level to a second level, and then in response to the speed of the vehicle reducing to a third threshold speed, deactivating the parking brake. In a fourth example of the method, optionally including one or more or each of the first through third examples, the first threshold speed is higher than the second threshold speed, and wherein the third threshold speed is lower than the second threshold speed. In a fifth example of the method, optionally including one or more or each of the first through fourth examples, modulating the second negative torque from the electric motor includes, during the speed of the vehicle being lower than the first threshold speed, applying a third level of negative torque solely from the electric motor. In a sixth example of the method, optionally including one or more or each of the first through fifth examples, modulating the second negative torque from the electric motor further includes, during the speed of the vehicle being higher than the first threshold speed, applying a fourth level of negative torque from the parking brake, the forth level of negative torque lower than the third level of negative torque. In a seventh example of the method, optionally including one or more or each of the first through sixth examples, modulating the second negative torque from the electric motor further includes, in response to the speed of the vehicle reducing to the second threshold speed, increasing the second negative torque from the forth level of negative torque to a fifth level of negative torque, and then in response to the speed of the vehicle reducing to the third threshold speed, further increasing the second negative torque from the fifth level to a sixth level.

The disclosure also provides support for a system for a vehicle, comprising: an electric motor coupled to an energy storage device providing positive and negative torque to wheels of the vehicle, a parking brake actuable to apply a varying range of negative torques to the wheels of the vehicle, and a controller storing instructions in non-transitory memory that, when executed, cause the controller to: in response to an indication of braking, apply negative torque from each of the electric motor and the parking brake simultaneously. In a first example of the system, the vehicle is a fork lift, and wherein the wheels of the vehicle are coupled to the electric motor via a one or more gears, a speed of the vehicle directly proportional to a speed of the electric motor. In a second example of the system, optionally including the first example, applying negative torque from each of the electric motor and the parking brake simultaneously includes, between the indication of braking and the vehicle coming to a stop, applying at a constant level a first level of negative torque from the parking brake and a second level of negative torque from the electric motor, the first level of negative torque lower than a maximum possible negative torque applicable from the parking brake and the second level of negative torque lower than another maximum possible negative torque applicable from the electric motor.

FIG. 2 shows example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Note that the example control and estimation routines included herein can be used with various electric motor and/or vehicle system configurations. The control methods and routines disclosed herein may be stored as executable instructions in non-transitory memory and may be carried out by the control system including the controller in combination with the various sensors, actuators, and other vehicle hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the vehicle control system, where the described actions are carried out by executing the instructions in a system including the various vehicle hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to electric motors of all types, for example asynchronous (induction) motors, permanent magnet motors, synchronous reluctance motors, and any other technology. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle, comprising:
during a first condition, providing positive torque from an electric motor to vehicle wheels while maintaining a parking brake inactive; and
during a second condition, modulating each of a first negative torque applied to the vehicle wheels from the parking brake and a second negative torque from the electric motor applied to the vehicle wheels,
wherein modulating the first negative torque from the parking brake includes, during a speed of the vehicle being lower than a first threshold speed, maintaining the parking brake inactive, and, during the speed of the vehicle being higher than the first threshold speed, applying a first level of negative torque from the parking brake.

2. The method of claim 1, wherein the first condition includes a tip-in of an accelerator pedal by an operator, and wherein the second condition includes application of the parking brake by the operator.

3. The method of claim 1, wherein modulating the first negative torque from the parking brake further includes, in response to the speed of the vehicle reducing to a second threshold speed, decreasing the first negative torque from the first level to a second level, and then, in response to the speed of the vehicle reducing to a third threshold speed, deactivating the parking brake.

4. The method of claim 3, wherein the first threshold speed is higher than the second threshold speed, and wherein the third threshold speed is lower than the second threshold speed.

5. The method of claim 4, wherein modulating the second negative torque from the electric motor includes, during the speed of the vehicle being lower than the first threshold speed, applying a third level of negative torque solely from the electric motor.

6. The method of claim 5, wherein modulating the second negative torque from the electric motor further includes, during the speed of the vehicle being higher than the first threshold speed, applying a fourth level of negative torque from the parking brake, the fourth level of negative torque lower than the third level of negative torque.

7. The method of claim 6, wherein modulating the second negative torque from the electric motor further includes, in response to the speed of the vehicle reducing to the second threshold speed, increasing the second negative torque from the fourth level of negative torque to a fifth level of negative torque, and then, in response to the speed of the vehicle reducing to the third threshold speed, further increasing the second negative torque from the fifth level to a sixth level of negative torque.

* * * * *